(12) United States Patent
Weiß et al.

(10) Patent No.: US 12,237,702 B2
(45) Date of Patent: Feb. 25, 2025

(54) CHARGING DEVICE FOR WIRELESSLY CHARGING AN ELECTRIC ENERGY STORE OF A MOBILE TERMINAL FOR A MOTOR VEHICLE, AND MOTOR VEHICLE COMPRISING A CHARGING DEVICE

(71) Applicant: AUDI AG, Ingolstadt (DE)

(72) Inventors: Simon Weiß, Titting (DE); Holger Thiel, Wettstetten (DE)

(73) Assignee: Audi AG, Ingolstadt (DE)

( * ) Notice: Subject to any disclaimer, the term of this patent is extended or adjusted under 35 U.S.C. 154(b) by 615 days.

(21) Appl. No.: 17/632,126

(22) PCT Filed: Jul. 30, 2020

(86) PCT No.: PCT/EP2020/071488
§ 371 (c)(1),
(2) Date: Feb. 1, 2022

(87) PCT Pub. No.: WO2021/019004
PCT Pub. Date: Feb. 4, 2021

(65) Prior Publication Data
US 2022/0278537 A1    Sep. 1, 2022

(30) Foreign Application Priority Data

Aug. 1, 2019   (DE) .................... 10 2019 211 519.5

(51) Int. Cl.
*H02J 7/00*    (2006.01)
*B60L 53/12*   (2019.01)
(Continued)

(52) U.S. Cl.
CPC ............ *H02J 7/0044* (2013.01); *B60L 53/12* (2019.02); *B60L 53/302* (2019.02);
(Continued)

(58) Field of Classification Search
CPC ........... H02J 7/0044; H02J 50/05; H02J 50/10
(Continued)

(56) References Cited

U.S. PATENT DOCUMENTS 5,103,374 A     4/1992  Azar
10,439,423 B2 * 10/2019 Lachnitt ................ H02J 7/0044
(Continued)

FOREIGN PATENT DOCUMENTS

DE    102014009724 A1    12/2014
DE    102015112127 A1    9/2016
(Continued)

OTHER PUBLICATIONS

International Search Report and Written Opinion of the International Searching Authority directed to related International Patent Application No. PCT/EP2020/071488, mailed Oct. 2, 2020, with attached English-language translation; 16 pages.
(Continued)

*Primary Examiner* — Nathaniel R Pelton
(74) *Attorney, Agent, or Firm* — Sterne, Kessler, Goldstein & Fox P.L.L.C.

(57) ABSTRACT

The present disclosure relates to a device for wireless charging of an electrical energy store of a mobile terminal for a motor vehicle, the device including charging electronics positioned within a housing. The housing includes a support region on which to place the mobile terminal, the support region including at least two elevations, each elevation has a first predetermined height extends along a length of the support region, and is arranged in parallel at a predetermined distance from one another. When the mobile terminal is placed on the at least two elevations, an air channel is formed. The housing includes at least one air inlet opening and at least one air outlet opening configured to blow air out into the air channel. Furthermore, at least one
(Continued)

barrier that swirls the air blown out into the air channel is arranged in the air channel.

14 Claims, 2 Drawing Sheets

(51) Int. Cl.
 *B60L 53/302* (2019.01)
 *H02J 50/00* (2016.01)
 *H02J 50/10* (2016.01)
(52) U.S. Cl.
 CPC ............ *H02J 50/005* (2020.01); *H02J 50/10* (2016.02); *H02J 2310/48* (2020.01)
(58) Field of Classification Search
 USPC ........................................................ 320/108
 See application file for complete search history.

(56) References Cited

U.S. PATENT DOCUMENTS

| 10,833,526 | B2 | 11/2020 | Thiel et al. | |
|---|---|---|---|---|
| 2014/0062392 | A1* | 3/2014 | Lofy | H05K 7/20136 320/108 |
| 2016/0181849 | A1 | 6/2016 | Govindaraj | |
| 2019/0215984 | A1 | 7/2019 | Pinkos et al. | |
| 2021/0162838 | A1 | 6/2021 | Thiel | |

FOREIGN PATENT DOCUMENTS

| DE | 102016216900 B3 | 10/2017 |
|---|---|---|
| DE | 202017107183 U1 | 12/2017 |
| DE | 102018207841 B3 | 4/2019 |
| DE | 102018000462 A1 | 5/2019 |
| EP | 3240376 A1 | 11/2017 |
| JP | H 04229697 A | 8/1992 |
| KR | 20140065090 A | 5/2014 |
| KR | 20180063704 A | 6/2018 |
| WO | WO 2017/190603 A1 | 11/2017 |

OTHER PUBLICATIONS

International Preliminary Report on Patentability directed to related International Patent Application No. PCT/EP2020/071488, completed Feb. 2, 2021, with attached English-language translation; 11 pages.

* cited by examiner

CHARGING DEVICE FOR WIRELESSLY CHARGING AN ELECTRIC ENERGY STORE OF A MOBILE TERMINAL FOR A MOTOR VEHICLE, AND MOTOR VEHICLE COMPRISING A CHARGING DEVICE

TECHNICAL FIELD

The present disclosure relates to a charging device for wireless charging of an electrical energy store of a mobile terminal for a motor vehicle and to a motor vehicle comprising such a charging device.

BRIEF SUMMARY

Charging devices for wireless charging, in particular for inductive charging of mobile communication devices or mobile terminals in general, are known from the prior art. A mobile terminal can be placed on a support surface of such a charging device, for example, and an alternating magnetic field generated by a primary coil of the charging device can be used to induce a charging current in a secondary coil located in the mobile terminal, and an electrical energy store of the mobile terminal, i.e. an accumulator, can be charged.

Such charging processes inevitably result in heat loss. This causes the charging electronics of the charging device and the mobile terminal to heat up. As is known, mobile terminals, such as cell phones, smartphones, tablet PCs, or the like, have their own temperature monitoring system, as a result of which the processor power is reduced and/or the charging current strength is limited when a predefinable threshold temperature is reached or exceeded in the mobile terminal. If this threshold temperature is exceeded by a predefinable amount, the mobile terminals are switched off completely in order to prevent damage to the mobile terminal or components thereof. The heating of the mobile terminal caused by the charging process can dramatically increase the duration of the charging process under certain circumstances. In order to counteract excessive heating of a mobile terminal during the charging process, cooling mechanisms, such as blowers, are usually used in charging devices.

An integration means intended for integrating a mobile terminal in a vehicle and comprising an electronics unit and a storage unit, wherein the electronics unit comprises an inductive charging unit by means of which the mobile terminal can be charged and wherein the storage unit comprises a storage mat on which the mobile terminal can be placed, is known from DE 10 2015 112 127 A1.

A charging device for wireless charging of a rechargeable electrical energy store of a mobile terminal comprising a housing, which device has an active air supply means which is configured to supply ambient air that can flow into a cooling body and guide said air toward a mobile terminal located on a support surface of the charging device, is known from DE 10 2016 216 900 B3.

A method for operating a ventilation device for providing an air flow is known from DE 10 2018 207 841 B3.

BRIEF DESCRIPTION OF THE DRAWINGS/FIGURES

DETAILED DESCRIPTION

Figure 1:
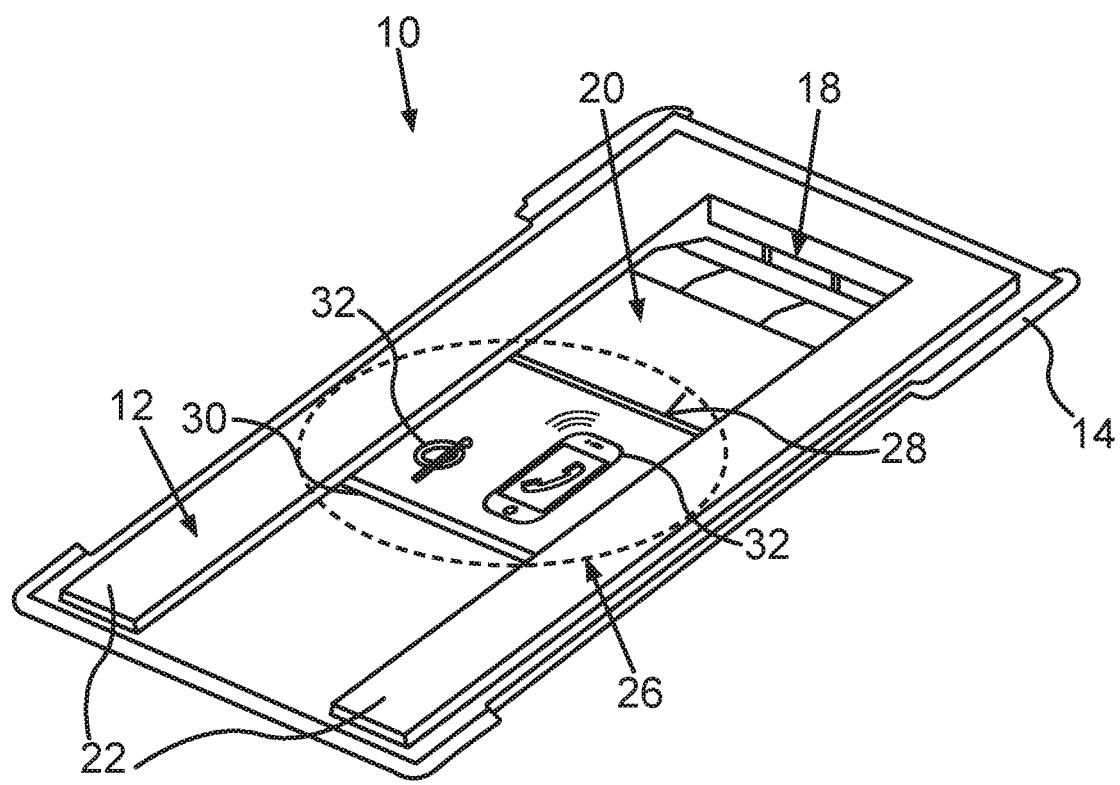
FIG. 1 is a perspective view of a charging device according to an embodiment.

The problem addressed by the present disclosure is that of providing a charging device for wireless charging of an electrical energy store of a mobile terminal in a motor vehicle, which charging device is improved in comparison with the prior art.

This problem is solved by the features of the independent claims. Advantageous further developments and embodiments of the present disclosure are disclosed by the dependent claims, the following description, and the drawings.

The present disclosure provides a charging device for wireless charging of an electrical energy store of a mobile terminal for a motor vehicle, the charging device having charging electronics and a housing in which the charging electronics are arranged. The housing has a support region on which to place the mobile terminal, the support region having at least two elevations, each of which has a first predetermined height, said elevations extending in the direction of the length of the support region, being arranged in parallel at a predetermined distance from one another, and, when the mobile terminal is in place, forming an air channel. The housing has at least one air inlet opening and at least one air outlet opening, the air outlet opening being arranged in the support region and being designed to blow air out into the air channel, at least one barrier being arranged in the air channel, which barrier is designed to swirl the air blown out into the air channel.

In other words, a charging device which comprises charging electronics in a housing is provided in a motor vehicle. The charging electronics can comprise a primary coil that generates a magnetic field by means of which a current is induced in a secondary coil of the mobile terminal, and the electrical energy store of the mobile terminal can thus be charged. The charging electronics can be provided in a housing in the motor vehicle; in particular, the housing can be arranged in a center console of the motor vehicle. A support region for placing and inductively charging the mobile terminal can be provided on the housing, the support region having at least two elevations in a longitudinal direction, each of which has the same first predetermined height and which run in parallel at a predetermined distance from one another. The first predetermined height can be one to two millimeters, preferably 1.2 millimeters, and the predetermined distance can be smaller than a width of the mobile terminal, for example. The predetermined distance can be in a range of from four to seven centimeters, in particular five centimeters, for example. Mobile terminals can include, for example, a cell phone, a smartphone, a laptop, or a tablet PC.

The mobile terminal placed on the support region, in particular on the at least two elevations that extend in the direction of the length of the support region, forms, together with the support region, an air channel, i.e. a tunnel through which air can flow, which channel is delimited laterally by the at least two elevations, at the bottom by the support region, and at the top by the mobile device.

Furthermore, the housing has at least one air inlet opening through which air can be introduced into the housing and an air outlet opening through which the air introduced into the housing can be blown out. For this purpose, for example, an air delivery device, such as a blower, can be provided, which generates the air flow for introducing and blowing out the air. The air outlet opening can in particular be arranged in the support region in such a way that the air from the air outlet opening is blown out into the air channel. For this reason, the air outlet opening can preferably be arranged at one end of the air channel, so that the air flows from the air outlet opening through the entire air channel. However, a central arrangement of the air outlet opening in the air channel is also possible, so that air is blown out of the air outlet opening from the center of the air channel to both long sides of the air channel.

Moreover, the air blown out into the air channel is swirled by a barrier in the air channel. For this purpose, for example, an elevation and/or depression which is arranged entirely or partially in a width and/or length of the air channel can be provided in the air channel. For example, a barrier designed as a step, or a grid-shaped barrier, can be provided which swirls the air that flows through the barrier. The barrier can also comprise a plurality of swirl elements on the support region in the air channel, for example a plurality of swirl elevations. The barrier can generate air eddies within the air channel, creating a turbulent flow, which can absorb more heat than a laminar flow, as not only the closest air layers absorb and dissipate heat.

The present disclosure has the advantage that the cooling performance of the charging device can be improved, as a result of which a charging process of the mobile terminal can be made faster.

The present disclosure also includes further embodiments, which offer additional advantages.

In one embodiment, the at least one barrier is designed as an elevation which has a second predetermined height, the second predetermined height being smaller than the first predetermined height. In other words, a further elevation, which acts as a barrier and which is smaller than the two elevations that run in the direction of the length of the support region, can be provided on the support region in the air channel. In this way, air layers in a laminar flow of the air flowing through the air channel can be slowed down, which can lead to swirls, which can absorb more heat and thus dissipate more heat.

The second predetermined height is preferably in a range of from 20 percent to 70 percent of the first predetermined height, in particular in a range of from 40 percent to 60 percent of the first predetermined height. This means that if the first predetermined height is 1.2 millimeters, for example, the second predetermined height can be in a range of from 0.24 millimeters to 0.84 millimeters, in particular in a range of from 0.48 millimeters to 0.72 millimeters. In particular, it was possible to establish that desired air swirling occurs starting from a height of 20 percent and air congestion in the air channel can be prevented at a height of up to 70 percent of the first predetermined height. Air congestion would have a negative effect on heat dissipation. The highest efficiency can be demonstrated in a range of from 40 percent to 60 percent of the first predetermined level.

In one embodiment, the at least one barrier comprises a first swirl elevation which is arranged perpendicularly with respect to the elevations that extend in the direction of the length of the support region. In other words, a bar, a step, or a platform, the edge of which is arranged perpendicularly with respect to the side walls of the air channel, can be arranged in the air channel as the first swirl elevation. This embodiment has the advantage that air which hits the first swirl elevation can be swirled evenly, as a result of which an improved cooling performance can be achieved in a region behind the first swirl elevation.

The width of the first swirl elevation preferably extends over the predetermined distance of the air channel. In other words, the first swirl elevation reaches over the entire width of the air channel. This has the advantage that all of the air flowing through the air channel can be swirled evenly, and thus optimum heat absorption of the air can be achieved.

In another embodiment, the at least one barrier has a ramp which rises in the direction of the air flow. This means that, for example, an incline can be provided by means of which the lower air layers in the air flow are guided upward, which can lead to increased swirling in the air. A straight incline with an angle of inclination of 25 to 75 degrees can be provided as the ramp, for example, but the ramp can also be circular or parabolic. This embodiment has the advantage that better air swirling and thus improved cooling performance can be achieved.

In another embodiment, the at least one barrier is arranged in a region of an induction coil of the charging electronics. During a charging process of the electrical energy store, heat can arise in particular in an overlap region of the primary coil of the charging electronics and the secondary coil of the mobile terminal. If the barrier is arranged in the region of the induction coil, the heat arising in this way can be better absorbed and dissipated by the air swirls. This has the advantage that the greatest cooling performance can be achieved in the overlap region.

In another embodiment, the charging device has an air delivery device to suck air in through the at least one air inlet opening and to blow the sucked-in air out through the at least one air outlet opening, and/or the air inlet opening of the charging device is connected to an air conditioning system of the motor vehicle, with the air conditioning system being designed to introduce air into the air inlet opening and blow it out through the air outlet opening. In other words, the charging device can have its own air delivery device, such as a fan or blower, which can suck air into the air inlet opening and then blow the sucked-in air out through the air outlet opening into the air channel.

Alternatively or additionally, the charging device in the motor vehicle can also be connected to an air conditioning system of the motor vehicle, the air conditioning system being able to blow the air into the air inlet opening either alone or with the assistance of the air delivery device, and the blown-in air then being guided through the air outlet opening into the air channel. This embodiment has the advantage that an air flow can be generated which can flow through the air channel and cooling for the mobile terminal can thus be provided. A cooling element which cools the air entering the housing is preferably also provided in the housing of the charging device. In particular, the air from the air conditioning system of the motor vehicle can also be cooled before it enters the air inlet opening.

In another embodiment, the at least one barrier has, at least in regions, an elevation pattern that forms a graphic symbol. In other words, an elevation pattern can be provided in regions as a barrier which, viewed from the outside, can represent a graphic symbol, i.e. a graphic identifier. For example, the graphic symbol can indicate a function of the charging device, e.g. a graphic identifier for wireless charging, for near field communication (NFC), and/or for a data coupling function (WLAN, Bluetooth). This embodiment has the advantage that, in addition to the swirl function for air, the barrier can indicate additional functions of the charging device to a user. In the simplest case, for example, the support region for wireless charging of the mobile terminal can be indicated to the user. Optimal positioning of the mobile terminal can also be indicated by means of the elevation pattern, as a result of which the cooling performance can be further improved.

According to the present disclosure, a motor vehicle having a charging device according to any of the preceding embodiments is also provided. The motor vehicle according to the present disclosure is preferably designed as an automobile, in particular as a passenger car, truck, minibus, or motorcycle.

The present disclosure also includes combinations of the features of the described embodiments.

Embodiments of the present disclosure are described below.

The embodiments explained below are preferred embodiments of the present disclosure. In the embodiments, the described components of the embodiments each represent individual features of the present disclosure which should be considered independently of one another and which each develop the present disclosure further independently of one another. The disclosure is therefore also intended to include combinations of the features of the embodiments other than those presented. Furthermore, the described embodiments may also be supplemented by further features of the present disclosure as already described.

In the drawings, the same reference signs refer to functionally identical elements.

FIG. 1 is a perspective view of a charging device 10, in particular of a support region 12 on which to place a mobile terminal (not shown in FIG. 1), for wireless charging of an electrical energy store of the mobile terminal. The charging device 10 can preferably be arranged in a center console of a motor vehicle and the support region 12 can be an upper side of a housing 14 of the charging device 10 in which charging electronics are provided for charging the mobile terminal.

The housing 14 can have at least one air inlet opening 16 (not shown in FIG. 1), which can be located, for example, on a side and/or underside of the housing. Furthermore, at least one air outlet opening 18 can be provided which is arranged in the support region 12 and which is designed to blow air out into an air channel 20.

The air channel 20 can be defined at the sides by two elevations 22 which extend in the direction of the length of the support region and are arranged parallel to one another at a predetermined distance. Furthermore, each of the two elevations 22 can be delimited from the support region 12 by a first predetermined height. The first predetermined height can be up to five millimeters, for example. Furthermore, the air channel 20 can be delimited at the top by the mobile terminal, which can be placed on the two elevations 22.

It is already possible to dissipate heat, which can arise during wireless charging of the electrical energy store of the mobile terminal, via air flowing through the air channel 20 with such a charging device 10. However, research has shown that the cooling performance can be significantly increased by arranging at least one barrier 26 in the air channel 20.

The barrier 26 is in particular intended to mean an elevation with a second predetermined height, it being possible for the second predetermined height to be smaller than the first predetermined height. In particular, the second predetermined height can be 10 to 80 percent of the first predetermined height, preferably 45 to 55 percent. In this way, an air flow of the air can be made to swirl, as a result of which the air can absorb and thus dissipate more heat from the mobile terminal 24. For example, the first predetermined height of the two elevations 22 can be four millimeters and the barrier, as the second predetermined height, can be 50 percent of the first predetermined height, i.e. two millimeters.

The barrier 26 can preferably have a first swirl elevation 28, which is arranged perpendicularly with respect to the elevations 22 that extend in the direction of the length of the support region, and the width of which extends over the entire predetermined distance of the air channel. In this way, it is possible to make the air in the air channel swirl evenly over the entire width of the air channel, as a result of which better heat absorption of the air can be achieved. In addition, one or more further swirl elevations 30 which generate further swirls can also be provided in the air channel.

The barrier 26 can preferably also have one or more elevation patterns 32, which can comprise, for example, a graphic symbol, in particular a graphic identifier of a customer function, such as a symbol for wireless charging, a WLAN symbol, or a near-field communication symbol. This has the advantage, in addition to further swirling of air, that technical information about the charging device 10 can also be displayed.

Figure 2:
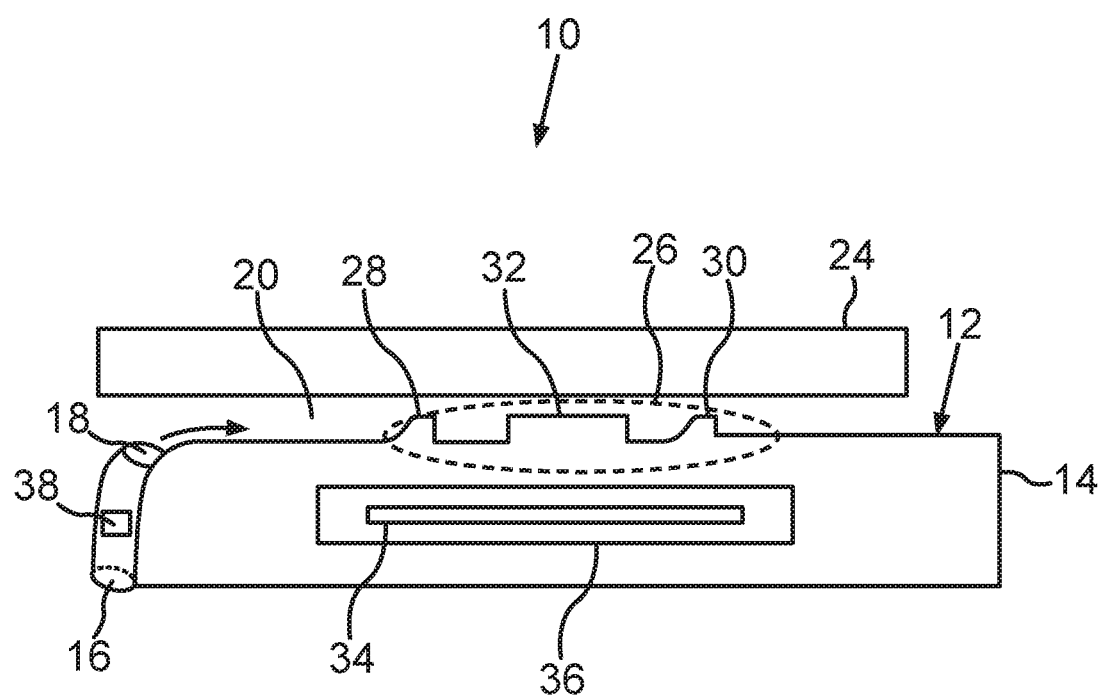
FIG. 2 is a schematic cross-sectional view of a charging device according to an embodiment.

FIG. 2 is a cross-sectional view of a charging device 10 according to an embodiment, the cross-section running in the longitudinal direction centrally through the charging device 10. In this depiction, the mobile terminal 24 is placed on the support region 12 of the housing 14, in particular on the elevations 22 which extend in the direction of the length of the support region and are not shown here.

In the charging device 10, the barrier 26 can preferably be arranged in a region of an induction coil 34 of the charging electronics 36 on the support region 12. This has the advantage that the air swirls are generated in a region in which the most heat can develop and an improved cooling performance can thus be achieved. In addition, the barrier 26, in particular the first swirl elevation 28, can have a ramp in the direction of the air flow of the blown-out air, i.e. the first swirl elevation 28 can rise in the direction of the air flow, for example. The slope of the ramp can be described by a linear function, a power function, or an exponential function, for example. This ramp has the advantage that stronger air swirls can be achieved and an improved cooling performance can thus be produced.

The air flow of the air which flows through the air channel 20 and which is blown out of the air outlet opening 18 into the air channel 20 can be sucked in, for example, by an air delivery device 38 via the at least one air inlet opening 16 before it is blown out through the air outlet opening 18. Alternatively or additionally, the air inlet opening 16 can also be connected to an air conditioning system of the motor vehicle (not shown), which can introduce the air, which is preferably precooled by the air conditioning system, into the at least one air inlet opening 16 before it is blown out into the air channel 20 to cool the mobile terminal 24.

Overall, the examples show how the present disclosure can provide effective heat dissipation for inductively charged mobile terminals.

The invention claimed is:

1. A device for wireless charging of an electrical energy store of a mobile terminal for a motor vehicle, the device comprising:
   a housing;
   charging electronics positioned within the housing;
   a support region on the housing on which to place the mobile terminal, the support region comprising at least two elevations, each elevation having a first predetermined height, each elevation extending along a length of the support region, and each elevation being arranged in parallel to one another and at a predetermined distance from one another;
   an air channel formed when the mobile terminal is placed on the at least two elevations of the support region on the housing; and at least one air inlet opening and at least one air outlet opening positioned in the support region on the housing and configured to blow air out into the air channel, wherein the support region on the housing comprises at least one barrier that extends into the air channel and is configured to swirl the air blown out into the air channel, wherein the at least one barrier comprises a first swirl elevation arranged perpendicularly to the at least two elevations extending along the length of the support region, wherein the first swirl elevation has a width of a predetermined distance extending into the air channel, and wherein the at least one barrier comprises a ramp configured to raise the air blown out into the air channel.

2. The device according to claim 1, wherein the at least one barrier has an elevation of a second predetermined height, wherein the second predetermined height is smaller than the first predetermined height.

3. The device according to claim 2, wherein the second predetermined height is in a range from 20% to 70% of the first predetermined height.

4. The device according to claim 2, wherein the second predetermined height is in a range from 40% to 60% of the first predetermined height.

5. The device according to claim 1, wherein the at least one barrier is positioned in a region of an induction coil of the charging electronics.

6. The device according to claim 1, further comprising:
an air delivery device configured to suck air in through the at least one air inlet opening and to blow the sucked-in air out through the at least one air outlet opening,
wherein the at least one air inlet opening is connected to an air conditioning system of the motor vehicle, and
wherein the air conditioning system is configured to introduce air into the at least one air inlet opening and to blow the introduced air out through the at least one air outlet opening.

7. The device according to claim 1, wherein the at least one barrier comprises an elevation pattern in at least one region of the at least one barrier, wherein the elevation pattern forms a graphic symbol.

8. A motor vehicle, comprising:
a device configured to wirelessly charge an electrical energy store of a mobile terminal, the device comprising:
a housing;
charging electronics positioned within the housing;
a support region on the housing on which to place the mobile terminal, the support region comprising at least two elevations, each elevation having a first predetermined height, each elevation extending along a length of the support region, and each elevation being arranged in parallel to one another and at a predetermined distance from one another;
an air channel formed when the mobile terminal is placed on the at least two elevations of the support region on the housing; and
at least one air inlet opening and at least one air outlet opening positioned in the support region on the housing and configured to blow air out into the air channel,
wherein the support region on the housing comprises at least one barrier that extends into the air channel and is configured to swirl the air blown out into the air channel,
wherein the at least one barrier comprises a first swirl elevation arranged perpendicularly to the at least two elevations extending along the length of the support region,
wherein the first swirl elevation has a width of a predetermined distance extending into the air channel, and
wherein the at least one barrier comprises a ramp configured to raise the air blown out into the air channel.

9. The motor vehicle according to claim 8, wherein the at least one barrier has an elevation of a second predetermined height, wherein the second predetermined height is smaller than the first predetermined height.

10. The motor vehicle according to claim 9, wherein the second predetermined height is in a range from 20% to 70% of the first predetermined height.

11. The motor vehicle according to claim 9, wherein the second predetermined height is in a range from 40% to 60% of the first predetermined height.

12. The motor vehicle according to claim 8, wherein the at least one barrier is positioned in a region of an induction coil of the charging electronics.

13. The motor vehicle according to claim 8, further comprising:
an air delivery device configured to suck air in through the at least one air inlet opening and to blow the sucked-in air out through the at least one air outlet opening,
wherein the at least one air inlet opening is connected to an air conditioning system of the motor vehicle, and
wherein the air conditioning system is configured to introduce air into the at least one air inlet opening and to blow the introduced air out through the at least one air outlet opening.

14. The motor vehicle according to claim 8, wherein the at least one barrier comprises an elevation pattern in at least one region of the at least one barrier, wherein the elevation pattern forms a graphic symbol.

* * * * *